(12) United States Patent
Righi et al.

(10) Patent No.: US 10,404,538 B1
(45) Date of Patent: Sep. 3, 2019

(54) REMOTE PLATFORM CONFIGURATION (71) Applicant: American Megatrends, Inc., Norcross, GA (US)

(72) Inventors: Stefano Righi, Lawrenceville, GA (US); Madhan B. Santharam, Duluth, GA (US); Howelle Blaine Summers, Decatur, GA (US)

(73) Assignee: American Megatrends International, LLC, Norcross, GA (US)

( * ) Notice: Subject to any disclaimer, the term of this patent is extended or adjusted under 35 U.S.C. 154(b) by 58 days.

(21) Appl. No.: 15/494,816

(22) Filed: Apr. 24, 2017

Related U.S. Application Data (63) Continuation of application No. 14/660,448, filed on Mar. 17, 2015, now Pat. No. 9,632,806.

(60) Provisional application No. 62/017,952, filed on Jun. 27, 2014.

(51) Int. Cl.
| | |
|---|---|
| *G06F 1/32* | (2019.01) |
| *G06F 9/44* | (2018.01) |
| *H04L 12/24* | (2006.01) |
| *G06F 9/445* | (2018.01) |
| *G06F 11/14* | (2006.01) |
| *G06F 9/4401* | (2018.01) |
| *G06F 1/3209* | (2019.01) |
| *G06F 21/57* | (2013.01) |
| *H04L 29/06* | (2006.01) |
| *G06F 8/654* | (2018.01) |

(52) U.S. Cl.
CPC ........ *H04L 41/082* (2013.01); *G06F 9/44505* (2013.01); *G06F 11/1441* (2013.01); *G06F 1/3209* (2013.01); *G06F 8/654* (2018.02); *G06F 9/4401* (2013.01); *G06F 21/572* (2013.01); *H04L 41/0813* (2013.01); *H04L 41/0853* (2013.01); *H04L 63/04* (2013.01); *H04L 63/08* (2013.01)

(58) Field of Classification Search
CPC .. G06F 1/3209; G06F 21/572; G06F 11/1441; G06F 9/4401; H04L 63/04; H04L 41/082; H04L 41/0853; H04L 41/0813
USPC ................................................. 713/1, 2, 100
See application file for complete search history.

(56) References Cited

U.S. PATENT DOCUMENTS

| | | | |
|---|---|---|---|
| 9,632,806 B1 * | 4/2017 | Righi | G06F 9/44505 |
| 2003/0196079 A1 | 10/2003 | Tyner et al. | |
| 2006/0143263 A1 | 6/2006 | Kumar et al. | |
| 2009/0132799 A1 | 5/2009 | Brumley et al. | |

OTHER PUBLICATIONS

Office action for U.S. Appl. No. 14/660,448, dated Jun. 23, 2016, Righi et al., "Remote Platform Configuration", 12 pages.

* cited by examiner

*Primary Examiner* — Michael J Brown
(74) *Attorney, Agent, or Firm* — Newport IP, LLC Shigeta | Hope (57) ABSTRACT

Technologies are disclosed that allow the firmware of a remotely located target device to be configured. The target device can receive a command to reboot into a special remote setup mode for remote configuration. Once in the remote setup mode, the firmware listens for and can respond to HTTP requests for information on configurable data and instructions to update the configurable data.

20 Claims, 7 Drawing Sheets

REMOTE PLATFORM CONFIGURATION

CROSS-REFERENCE TO RELATED APPLICATIONS

This application is a continuation of U.S. patent application Ser. No. 14/660,448 filed Mar. 17, 2015, entitled "Remote Platform Configuration," (now U.S. Pat. No. 9,632,806) which claims the benefit of provisional U.S. patent application Ser. No. 62/017,952 filed Jun. 27, 2014, entitled "Systems And Methods For Remote Platform Configuration," which are expressly incorporated herein by reference in their entireties.

BACKGROUND

In many computing systems, low-level instruction code, or firmware, is used as an intermediary between the hardware components of the computing system and high-level software executing on the computing system, such as an operating system. The firmware provides a set of software routines that allow high-level software to interact with the hardware components of the computing system using standard calls. Configuring the firmware requires the use of complex operations, tools and utilities that are platform and operating system specific.

In some environments, such as in server farms, firmware may need to be updated for computers that lack consoles or that are remotely located. A baseboard management controller (BMC) attached to the motherboard of a computer can allow the firmware of the computer to be configured using keyboard, video, and mouse redirection. However, BMCs are not practical for small computer systems such as small servers, desktops and laptops, or any other scenario without a BMC or with a BMC with limited functionality. It is with respect to these and other considerations that the disclosure made herein is presented.

SUMMARY

Technologies are described herein for remote platform configuration. Through the utilization of the technologies and concepts presented herein, firmware can be configured for headless computing systems where a console is not available, or remotely for any network-connected computer.

According to one aspect presented herein, a target device can receive a command from a remotely located client computer instructing the target device to reboot and enter into a remote firmware setup mode. During the reboot, the firmware of the target device places the reboot process on standby while listening for further communication from the client computer. If further communication is received, the target computer can authenticate the sender and enter the remote firmware setup mode.

According to another aspect presented herein, the target computer may receive the command to reboot into the remote firmware mode from a user in physical proximity to the target computer. Once authenticated contact is made with a remotely located client computer, the target device may also enter the remote firmware setup mode.

According to yet another aspect presented herein, the target computer may receive and respond to inquiries from the authenticated client computer regarding configurable firmware data. The target computer may receive and respond to instructions from the client computer to update configurable firmware data.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Embodiments of the disclosure presented herein provide technologies for remote platform configuration. In the following detailed description, references are made to the accompanying drawings that form a part hereof, and in which are shown by way of illustration specific embodiments or examples. Referring now to the drawings, in which like numerals represent like elements throughout the several figures, aspects of an exemplary operating environment and the implementations provided herein will be described.

Figure 1:
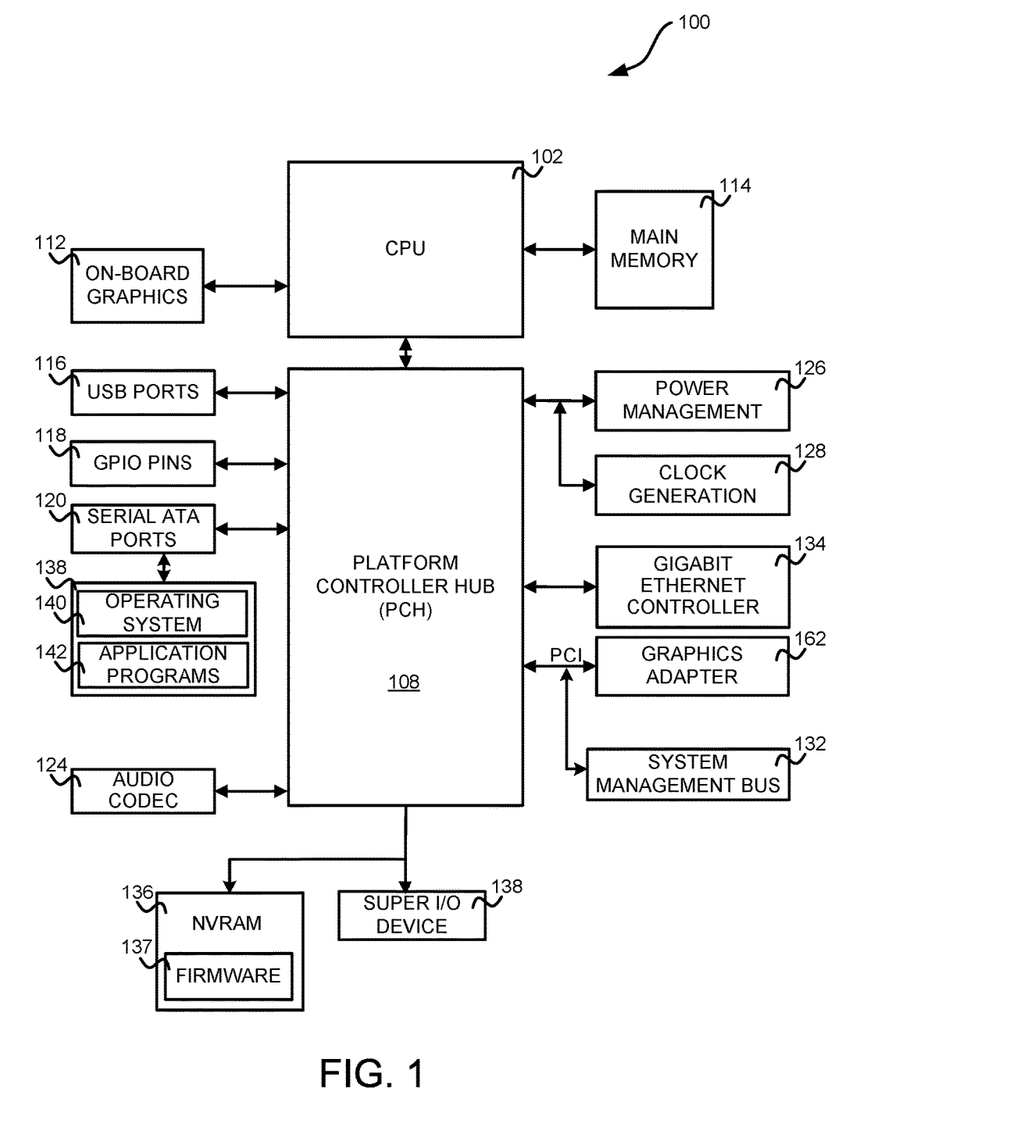
FIG. 1 is a computer architecture diagram that illustrates various components of a computer that provides an illustrative operating environment for the implementations presented herein.

FIG. 1 and the following discussion are intended to provide a brief, general description of a suitable computing environment in which embodiments presented herein may be implemented. While the embodiments presented herein are described in the general context of program modules that execute in conjunction with the execution of a computer firmware, those skilled in the art will recognize that various embodiments may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, embedded systems, and the like. Embodiments presented herein may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for practicing the embodiments discussed herein will be described. It should be appreciated that although the embodiments described herein are discussed in the context of a conventional desktop or server computer, the embodiments may be utilized with virtually any type of computing device. FIG. 1 shows an illustrative computer architecture for a computing system 100 that is operative for remote platform configuration.

In order to provide the functionality described herein, the computing system 100 can include a baseboard, or "motherboard," which can be a printed circuit board to which a multitude of components or devices may be connected by way of a system bus or other electrical communication path. In one illustrative embodiment, a central processing unit ("CPU") 102 operates in conjunction with a Platform Controller Hub ("PCH") 108. The CPU 102 may be a standard central processor that performs arithmetic and logical operations necessary for the operation of the computing system 100. The computing system 100 may include a multitude of CPUs 102. Each CPU 102 might include multiple processing cores.

The CPU 102 provides an interface to a random access memory ("RAM") used as the main memory 114 in the computing system 100 and, possibly, to an on-board graphics adapter 112. The PCH 108 may provide an interface between the CPU 102 and the remainder of the computing system 100.

The PCH 108 may also be responsible for controlling many of the input/output functions of the computing system 100. In particular, the PCH 108 may provide one or more universal serial bus ("USB") ports 116, an audio codec 124, a Gigabit Ethernet Controller 134, and one or more general purpose input/output ("GPIO") pins 118. The USB ports 116 may include USB 2.0 ports, USB 3.0 ports and USB 3.1 ports among other USB ports. The audio codec 124 may include Intel High Definition Audio, Audio Codec '97 ("AC'97") and Dolby TrueHD among others. Power management circuitry 126 and clock generation circuitry 128 may also be utilized through the PCH 108.

The PCH 108 may also include functionality for providing networking functionality through a Gigabit Ethernet Controller 134. The Gigabit Ethernet Controller 134 is capable of connecting the computing system 100 to another computing system via a network. Connections which may be made by the Gigabit Ethernet Controller 134 may include LAN or WAN connections. LAN and WAN networking environments are commonplace in offices, enterprise-wide computer networks, intranets, and the internet.

The PCH 108 may also provide a bus for interfacing peripheral card devices such as a graphics adapter 162. In one embodiment, the bus comprises a PCI bus. The PCI bus may include a Peripheral Component Interconnect ("PCI") bus, a Peripheral Component Interconnect eXtended ("PCI-X") bus or a Peripheral Component Interconnect Express ("PCIe") bus among others. The PCH 108 may also provide a system management bus 132 for use in managing the various components of the computing system 100.

The PCH 108 is also configured to provide one or more interfaces for connecting mass storage devices to the computing system 100. For instance, according to an embodiment, the PCH 108 includes a serial advanced technology attachment ("SATA") adapter for providing one or more serial ATA ports 120. The serial ATA ports 120 may be connected to one or more mass storage devices storing an operating system 140 and application programs 142, such as the SATA disk drive 138. As known to those skilled in the art, an operating system 140 comprises a set of programs that control operations of a computer and allocation of resources. An application program 142 is software that runs on top of the operating system 140 software, or other runtime environment, and uses computer resources to perform application specific tasks desired by the user.

According to one embodiment of the invention, the operating system 140 comprises the LINUX operating system. According to another embodiment of the invention the operating system 140 comprises a version of the WINDOWS operating system from MICROSOFT CORPORATION. According to other embodiments, the operating system 140 can comprise the UNIX, SOLARIS, or Mac OS X operating system. It should be appreciated that other operating systems may also be utilized.

The mass storage devices connected to the PCH 108, and their associated computer-readable storage media, provide non-volatile storage for the computing system 100. Although the description of computer-readable storage media contained herein refers to a mass storage device, such as a hard disk or CD-ROM drive, it should be appreciated by those skilled in the art that computer-readable storage media can be any available media that can be accessed by the computing system 100.

By way of example, and not limitation, computer-readable storage media may comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computing system 100.

A low pin count ("LPC") interface may also be provided by the PCH 108 for connecting a Super I/O device 138. The Super I/O device 138 is responsible for providing a number of input/output ports, including a keyboard port, a mouse port, a serial interface, a parallel port, and other types of input/output ports. The LPC interface may also connect a computer storage media such as a ROM or a flash memory such as a non-volatile random access memory ("NVRAM") 136 for storing the firmware 137 that includes program code containing the basic routines that help to start up the computing system 100 and to transfer information between elements within the computing system 100. Some examples of firmware 137 include Basic Input/Output System ("BIOS"), firmware that is compatible with the Unified Extensible Firmware Interface ("UEFI"), or Open Firmware among others.

It should be appreciated that the program modules disclosed herein, including the firmware 137, may include software instructions that, when loaded into the CPU 102 and executed, transform a general-purpose computing system into a special-purpose computing system customized to facilitate all, or part of, the operations disclosed herein. As detailed throughout this description, the program modules may provide various tools or techniques by which the computing system 100 may participate within the overall systems or operating environments using the components, logic flows, and/or data structures discussed herein.

The CPU 102 may be constructed from any number of transistors or other circuit elements, which may individually or collectively assume any number of states. More specifically, the CPU 102 may operate as a state machine or finite-state machine. Such a machine may be transformed to a second machine, or a specific machine, by loading executable instructions contained within the program modules. These computer-executable instructions may transform the CPU 102 by specifying how the CPU 102 transitions between states, thereby transforming the transistors or other circuit elements constituting the CPU 102 from a first machine to a second machine, wherein the second machine may be specifically configured to perform the operations disclosed herein. The states of either machine may also be transformed by receiving input from one or more user input devices, network interfaces (such as the gigabit ethernet controller 134), other peripherals, other interfaces, or one or more users or other actors. Either machine may also transform states, or various physical characteristics of various output devices such as printers, speakers, video displays, or otherwise.

Encoding the program modules may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules may transform the physical state of the semiconductor memory 114, 136, 137 when the software or firmware 137 is encoded therein. For example, the software may transform the state of transistors, capacitors, or other discrete circuit elements constituting the semiconductor memory.

As another example, the storage media may be implemented using magnetic or optical technology such as hard drives or optical drives. In such implementations, the program modules may transform the physical state of magnetic or optical media, when the software is encoded therein. These transformations may include altering the magnetic characteristics of particular locations within given magnetic media. These transformations may also include altering the physical features or characteristics of particular locations within given optical media to change the optical characteristics of those locations. It should be appreciated that various other transformations of physical media are possible without departing from the scope and spirit of the present description.

It should be appreciated that the computing system 100 may comprise other types of computing devices, including hand-held computers, embedded computer systems, personal digital assistants, and other types of computing devices known to those skilled in the art. It is also contemplated that the computing system 100 may not include all of the components shown in FIG. 1, may include other components that are not explicitly shown in FIG. 1, or may utilize an architecture completely different than that shown in FIG. 1.

Figure 2:
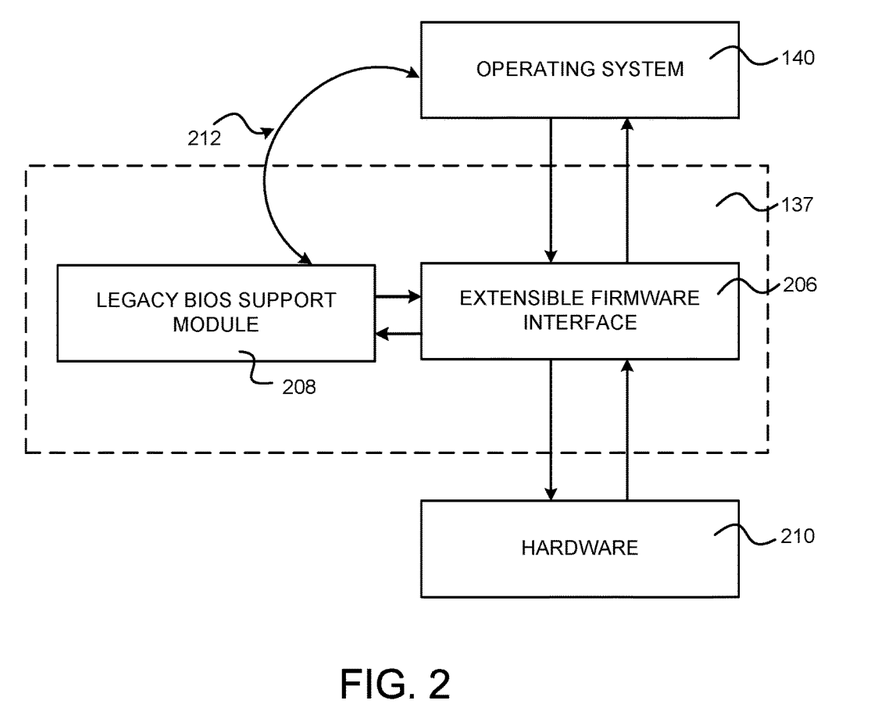
FIG. 2 is a block diagram illustrating aspects of an interface between a firmware and an operating system according to one or more embodiments presented herein.

Referring now to FIG. 2, a block diagram illustrates aspects of an interface between a UEFI firmware 137 and an operating system 140 according to one or more embodiments presented herein. As described with respect to FIG. 1, the firmware 137 may comprise a firmware compatible with the UEFI Specification (which may be referred to herein as the "Specification") from the UEFI FORUM. The UEFI Specification describes an interface between the operating system 140 and the system firmware 137. The UEFI Specification also defines an interface that platform firmware may implement, and an interface that the operating system 140 may use while booting. How the firmware 137 implements the interface may be left up to the manufacturer of the firmware. The Specification can define a way for the operating system 140 and firmware 137 to communicate information necessary to support the operating system boot process.

According to some embodiments, both a UEFI-compatible firmware 206 and a legacy BIOS support module 208 may be present in the UEFI firmware 137. This allows the computing system 100 to support a UEFI firmware interface and a legacy BIOS firmware interface. In order to provide this functionality, an interface 212 may be provided for use by legacy operating systems and applications. According to other embodiments, only one of the UEFI-compatible firmware 206 and the legacy BIOS support module 208 may be present in the firmware 137. According to yet other embodiments, the firmware 137 may interface with the hardware 210 through any of various other architectures, components, or modules for the firmware without specific involvement of the UEFI-compatible firmware 206 or the legacy BIOS support module 208. Additional details regarding the operation and architecture of a UEFI Specification compliant-firmware can be found in the UEFI Specification and in the specifications that make up the EFI Framework, both of which are expressly incorporated herein by reference.

Figure 3:
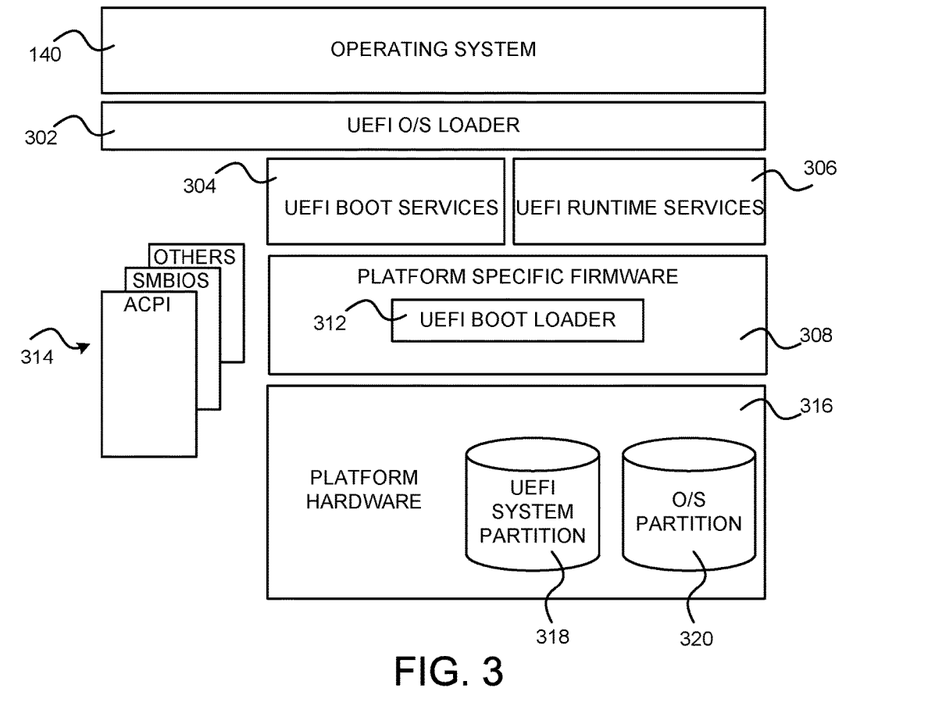
FIG. 3 is a block diagram illustrating an architecture for firmware that provides an operating environment for one or more embodiments presented herein.

Turning now to FIG. 3, a block diagram illustrates the architecture for a UEFI specification-compliant firmware that provides an operating environment for one or more embodiments presented herein. As shown in FIG. 3, the architecture can include platform hardware 316 and an operating system 140. The platform firmware 308 may retrieve an operating system (OS) image from the UEFI system partition 318 using a UEFI boot loader O/S Loader 302 ("OS boot loader 302"). The OS boot loader 302 may retrieve an OS image from the O/S partition 320.

Once started, the OS boot loader 302 may continue to boot the complete operating system 140. In doing so, the OS boot loader 302 may use UEFI boot services 304, runtime services 306, and interface to other supported specifications to survey, comprehend, and initialize the various platform components and the operating system software that manages them. Thus, interfaces 314 from other specifications may also be present on the system. For example, the Advanced Configuration and Power Management Interface ("ACPI") and the System Management BIOS ("SMBIOS") specifications may be supported.

UEFI boot services 304 may provide interfaces for devices and system functionality used during boot time. UEFI runtime services 306 may also be available to the UEFI boot loader 312 during the boot phase. For example, a set of runtime services may be presented to ensure appropriate abstraction of base platform hardware resources used by the operating system 140 during its operation. UEFI allows extension of platform firmware by loading UEFI driver and UEFI application images which, when loaded, have access to UEFI-defined runtime and boot services. Various program modules can provide the boot-time and run-time services.

Figure 4:
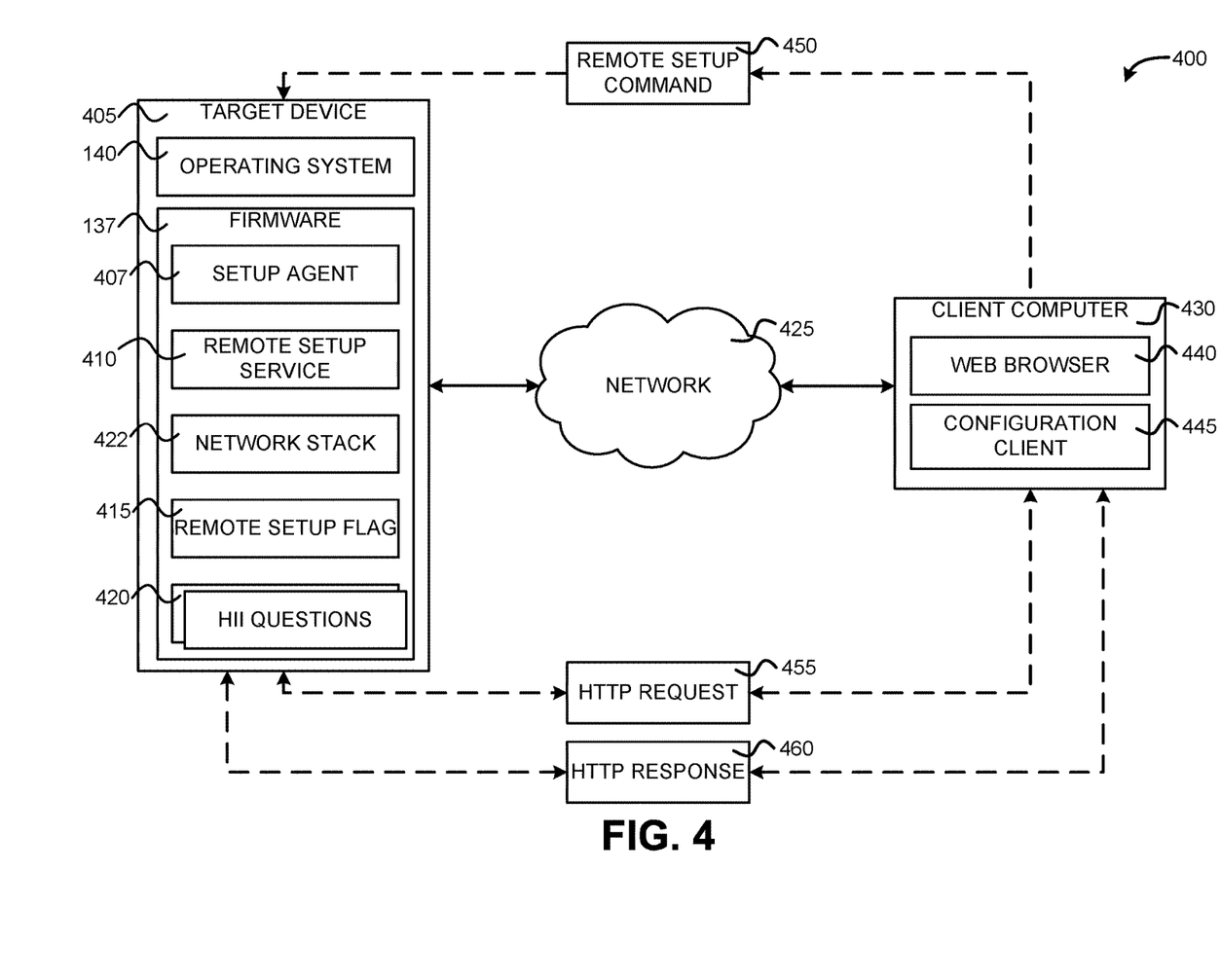
FIG. 4 is a system diagram showing aspects of one mechanism disclosed herein for remote platform configuration.

Referring now to FIG. 4, a system diagram showing a system 400 that embodies the concepts and technologies disclosed herein will be described. The system 400 may include a target device 405 that is to be configured remotely, and a client computer 430 from which remote configuring may be accomplished. The target device 405 and client computer 430 may be server computers, desktop workstations, laptops, notebooks, set-top boxes, or any other types of computing systems. In some embodiments, the target device 405 may feature a firmware 137 and operating system 140 as described with regard to FIG. 1 and FIG. 2 respectively. In some embodiments, run-time services provide interfaces that allow variables stored in NVRAM 136 to be set and retrieved from the operating system 140. The operating system 140 may receive communications from a client computer 430 through a network 425 such as the Internet or a local area network (LAN). In other embodiments, the firmware 137 may contain instructions for a setup agent 407 for receiving communications from the client computer 430 through the network 425.

According to an embodiment, a configuration client 445 may send communications from the client computer 430 to the run-time services by way of standard tools provided by the operating system 140. For the purposes of illustration, not limitation, such standard tools may include the use of a remote desktop connection (RDC) or script-based tools. In other embodiments, the configuration client 445 may send communications from the client computer 430 to the setup agent 407. The configuration client 445 may execute on top of a web browser 440. In various implementations, the configuration client 445 may be a script, add-on, plugin application (e.g., a Flash program), or other such addition to the web browser 440. In other embodiments, the configuration client 445 may be a standalone application, separate from the web browser 440, which communicates with the target device 405 over a TCP/IP connection.

According to various embodiments, communications may also be exchanged between the client computer 430 and a remote setup service 410 configured to run from the firmware 137 of the target device 405 during a specialized remote setup mode. The remote setup mode may be entered during a reboot of the target device 405. In an embodiment, the remote setup service 410 executes before the OS bootloader 302 loads the operating system 140. In such a pre-boot execution environment, network communication services, including TCP/IP communication, may be provided to the remote setup service 410 by a UEFI network stack 422. The remote setup service 410 may receive HTTP requests 455 from the configuration client 445 and may respond with HTTP responses 460. In some instances, the remote setup service 410 may alert listeners that is is ready for remote configuration by broadcasting data via HTTP requests 455 and receive HTTP responses 460. It should be appreciated that, to aid in description, the request and response in the system diagram of FIG. 4 are illustrated as being an HTTP Request 455 and an HTTP Response 460. However in some instances, such as during authentication operations, the request may be an HTTPS Request 455 and the response may be an HTTPS Response 460.

In various implementations, the communications from the configuration client 445 may include a remote setup command 450. In some embodiments, the remote setup command 450 may be sent in an HTTP request 455. In other embodiments, the remote setup command 450 may be received using communications specific to the operating system 140. Using the standard operating system tools, the remote setup command 450 may instruct run-time services in the operating system 140 to set a remote setup flag 415, then to reboot the target device 405. In some embodiments, the remote setup command 450 may be received by the setup agent 407, which may set the remote setup flag 415 and reboot the target device 405. The remote setup flag 415 can be a variable, a flag, or an enumerated value that, when present, indicates that the target device 405 should enter the remote setup mode. Upon rebooting, the remote setup service 410 may determine whether the remote setup flag 415 has been set. There are several ways by which the remote setup flag 415 may be set. On UEFI-compatible operating systems 140, run-time services may be utilized to specify a particular memory location in which a non-volatile UEFI variable will be stored and checked by the remote setup service 410 upon reboot. In other embodiments, the setup agent 407 may utilize internal interfaces between non-UEFI-compatible operating systems 140 and the firmware 137 to store a variable value that the remote setup service 410 can then retrieve upon reboot. In yet another embodiment, when verification of a user's physical presence is needed prior to entering the remote setup mode, the remote setup flag 415 may be set locally when a user presses a particular button or hotkey combination during reboot.

Upon rebooting, if the remote setup service 410 determines that the remote setup flag 415 has been set, the remote setup service 410 will suspend the normal reboot process during a standby period, while listening on a pre-specified port for an HTTPS request 455. If no HTTPS request 455 is received during the standby period, the reboot process may proceed in the normal fashion. If the remote setup service 410 determines that an HTTPS request 455 has been received during the standby period, the remote setup service 410 may authenticate the sender. Authentications may be performed using any authentication techniques implemented in the firmware 137 including password authentications.

It should be appreciated that a remote setup flag 415 on the target device 405 is not necessary to enable the remote setup mode. According to some embodiments, the target device 405 can be configured to listen for an HTTP request 455 each time the computing system 100 reboots. The remote setup service 410 may determine whether an HTTP request 455 has been received from the network 425 during a timeout period in the power-on self-test (POST). The determination may require that an HTTP request 455 be received from specific IP or media access control (MAC) addresses to be valid, or may accept any HTTP request 455 as being valid. In another embodiment, the remote setup service 410 may check for the presence of a remote setup flag 415 stored on a separate, network-accessible machine, either by default, or upon being properly provisioned during a first deployment.

It should also be appreciated that, to facilitate understanding, the remote setup service 410 is generally described as listening for an HTTPS request 455 to be received during a timeout period in the POST operation. However, in some embodiments, upon a reboot, the remote setup service 410 may broadcast information alerting listeners that the system is ready to be configured remotely. Upon receiving the broadcast, a user may respond by directing the configuration client 445 to send an HTTPS response 460 to the remote setup service 410 indicating the desire to enter the remote setup mode. Accordingly, the remote setup service 410 may be configured to listen for any HTTP or HTTPS communication during the timeout period, whether the communication is an HTTP request 455, HTTP response 460, HTTPS request 455, or HTTPS response 460.

If authentication is successful, REST APIs may be used by the configuration client 445 to discover, display, and update configuration values for the firmware 137. Configuration values may include questions, data, data attributes (e.g., the type of data or data offsets), and other information. For example, and not for limitation, the configuration client 445 may use the get/set interface of the HTTP REST API to send an HTTP request 455 seeking a list of setup questions available for the firmware 137. Using the platform level data model (PLDM) defined by the distributed management task force (DMTF), the remote setup service 410 may build PLDM representations, Human Interface Infrastructure ("HII") questions 420, of the setup questions. The HII questions 420 may be returned to the configuration client 445 in an HTTP response 460. For the purposes of further illustration, and not limitation, if a configuration client 445 seeks to modify the length of the standby period, the value of a "timeout" parameter will need to be modified.

The configuration client 445 may send an HTTP request 455 seeking the value of the timeout parameter: \\PlatformName\PLDM\Timeout. The remote setup service 410 may respond with an HTTP response 460 containing xml representing the HII question 420 for the parameter. The xml may contain the parameter name and value for the timeout parameter. The configuration client 445 may send an additional HTTP request 455 containing the name of the parameter and a new value for the parameter. Upon receiving the HTTP request 455, the remote setup service 410 may update the parameter value. In some embodiments, a configuration client 445 may use a client-side scripting language, such as JavaScript, to make simultaneous updates to a number of different target devices 405, as might occur in a server farm environment. A configuration client 445 may make updates to multiple parameters on a single target device 405. In some embodiments, a configuration client 445 may also make updates to multiple parameters on multiple target devices 405.

Figure 5:
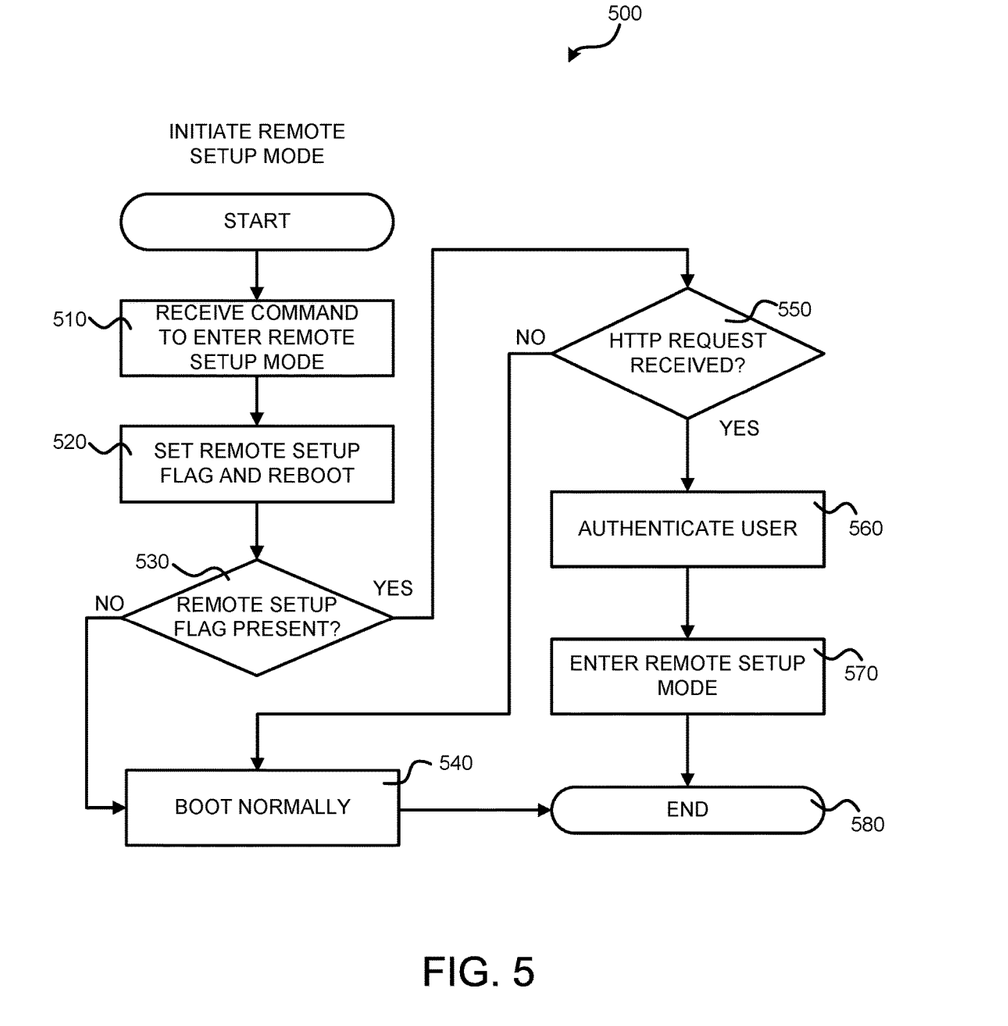
FIG. 5 is a flow diagram showing a routine for initiating a remote setup mode for remote platform configuration according to embodiments presented herein.

Referring now to FIG. 5, a flow diagram showing a routine 500 for initiating a remote setup mode for remote platform configuration according to embodiments presented herein will be described. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 500 begins at operation 510 where UEFI run-time services 306 or a setup agent 407 may receive a remote setup command 450 instructing the target device 405 to enter the remote setup mode. The remote setup command 450 may be contained in an HTTP request 455. The routine 500 may proceed to operation 520 where UEFI run-time services 306 specify the particular memory location in which a non-volatile UEFI variable will be stored and later checked by the remote setup service 410 upon reboot. In other embodiments, the setup agent 407 may utilize internal interfaces between the operating system 140 and the firmware 137 to store a variable value that the remote setup service 410 may retrieve during the reboot. In other implementations, the remote setup flag 415 may alternatively be set locally by a hotkey combination entered during reboot. From operation 520, the routine 500 may proceed to operation 530.

At operation 530, the remote setup service 410 determines the status of the remote setup flag 415 during the reboot of the target device 405. If the remote setup flag 415 has not been set, the routine 500 may proceed to operation 540 where the target device 405 continues the reboot in a normal manner. However, if the remote setup service 410 determines the remote setup flag has been set, the routine 500 may proceed to operation 550 where the remote setup service 410 determines whether an HTTP request 455 has been received. The remote setup service 410 will hold the reboot operation in standby for a period of time determined by the "timeout" parameter discussed above with regard to the HII question 420. As noted earlier, a remote setup flag 415 is not necessary for the target device 405 to enter the remote setup mode. In some embodiments, the routine 500 for initiating a remote setup mode may begin directly at operation 550, where the target device 405, upon each reboot, is configured to listen for an HTTP communication (an HTTP request 455 or an HTTP response 460) that occurs during the timeout period. If an HTTP communication is not received during the standby period, the routine 500 proceeds to operation 540, where the reboot proceeds normally.

From operation 540, the routine 500 may continue to operation 580, where the routine 500 ends. If the remote setup service 410 determines that an HTTP or HTTPS communication was received on a pre-specified port during the standby period, the routine 500 may proceed to operation 560 where a user may be authenticated. Authentication may be executed using any industry standard security mechanism to ensure adoption of the desired level of security. For illustration, not for limitation, an example list may include the use of passwords, usernames and passwords, public key infrastructure (PKI), and other known techniques. In some embodiments, the desired level of security may be guaranteed on an open communication, when the communication originates from a well-defined and specified device. After a user is successfully authenticated, the routine 500 may continue to operation 570 where the remote setup mode is entered. From operation 570, the routine 500 may proceed to operation 580 where the routine 500 ends.

Figure 6:
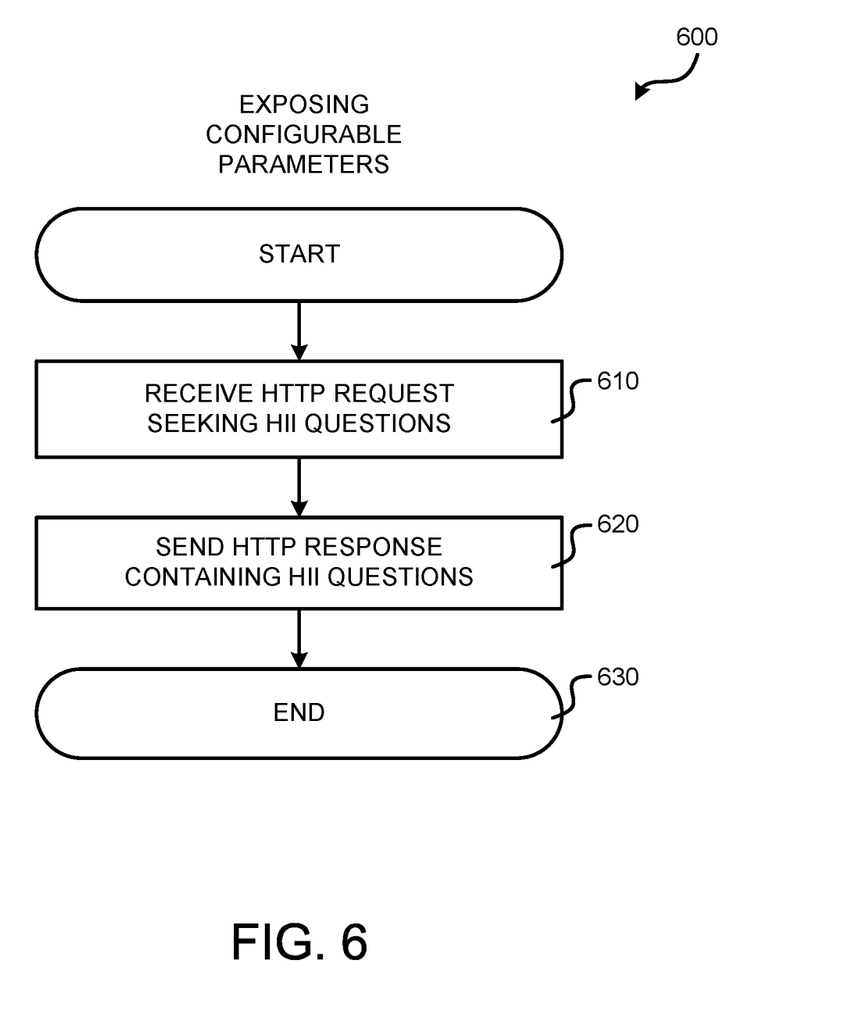
FIG. 6 is a flow diagram showing a routine for exposing configurable parameters to a client computer.

Turning now to FIG. 6, a routine 600 for exposing configurable parameters to a client computer 430 will be described. The routine 600 begins at operation 610 where the remote setup service 410 receives an HTTP request 455 from an authenticated configuration client 445 user. The HTTP request 455 may utilize REST APIs specifying specific parameters for display or a listing of all configurable parameters. At operation 620, the remote setup service 410 receives HII questions 420 representing the requested parameters. An HTTP response 460 containing xml for the requested parameters is sent to the configuration client 445. From operation 620, the routine 600 proceeds to operation 630 where the routine 600 ends.

Figure 7:
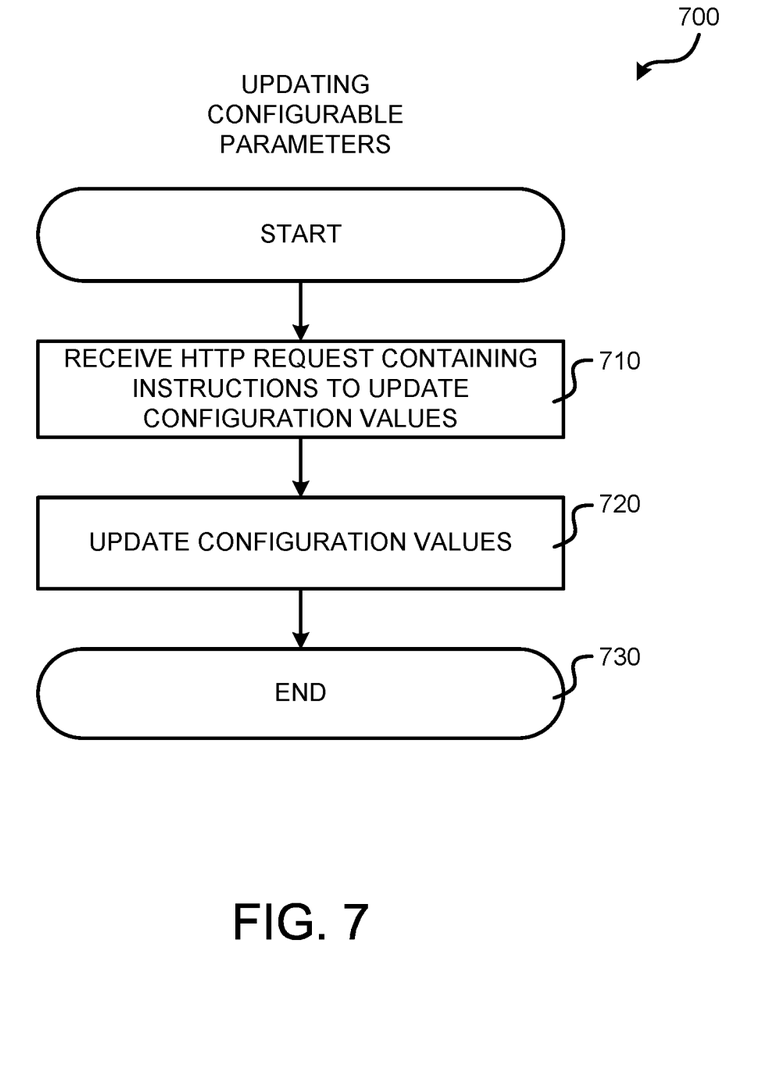
FIG. 7 is a flow diagram showing a routine for updating configurable parameters.

FIG. 7 shows a routine 700 for updating configurable parameters. The routine 700 begins at operation 710 where the remote setup service 410 receives an HTTP request 455 from an authenticated configuration client 445 user. The HTTP request 455 may utilize REST APIs specifying a configurable parameter or group of parameters and values to be assigned to the parameters. The routine 700 may proceed from operation 710 to operation 720 where the remote setup service 410 updates the specified parameters with the supplied values. From operation 720, the routine 700 proceeds to operation 730 where the routine 700 ends.

It should be appreciated that, according to implementations, the mechanisms disclosed herein may allow a web browser to be used as a user interface for platform configurations, remote or local, for one or more target devices 405 without using additional hardware such as BMCs, or custom firmware user interfaces. The mechanisms disclosed herein may further allow the firmware 137 of a target device 405 to be configured while providing safeguards such as authenticated messaging or headless system solutions, where a user is required to interact with the target device 405 (e.g, by pressing a specific button or combination of buttons) to ensure the user is physically present.

Based on the foregoing, it should be appreciated that technologies for remote platform configuration have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claim.

What is claimed is:

1. A system, comprising:
   one or more processors; and
   a non-transitory computer-readable storage medium having computer-executable instructions stored thereupon that, when executed by the one or more processors, cause the system to:
   determine a computer for which one or more firmware parameters of a firmware are to be updated;
   generate a first request for the computer, the first request indicating that the computer is to enter a firmware remote setup mode;
   send the first request to the computer to cause the computer to at least temporarily suspend one or more aspects of a normal reboot process during a reboot;
   receive data about a current configuration of the firmware;
   generate, based at least in part on the current configuration, a second request, the second request to indicate respective parameter values corresponding to each of the one or more firmware parameters; and
   send the second request to the computer while the one or more aspects of the normal reboot process are suspended.

2. The system of claim 1, wherein the first request is formatted in one of hypertext transfer protocol (HTTP) or hypertext transfer protocol secure (HTTPS).

3. The system of claim 1, wherein the data includes human interface infrastructure (HII) responses.

4. The system of claim 1, wherein the first request comprises instructions to the computer to set a remote setup flag and to initiate the reboot.

5. The system of claim 1, wherein the instructions, when executed by the one or more processors, further cause the system to:
   receive a broadcast message that is transmitted from the computer subsequent to the computer initiating the reboot, the broadcast message indicating that the computer is ready for remote configuration.

6. The system of claim 1, wherein sending the second request comprises sending the second request within a predetermined timeout period after the computer initiates the reboot.

7. The system of claim 1, wherein the one or more aspects of the normal reboot process that are suspended during the reboot include at least some aspects of a Power-On Self-Test operation.

8. The system of claim 1, wherein the one or more aspects of the normal reboot process are suspended while the computer listens for the second request.

9. A non-transitory computer-readable storage medium having computer-executable instructions stored thereupon that, when executed by one or more processors, cause the one or more processors to:
   determine a computer for which one or more firmware parameters of a firmware are to be updated;
   generate a first request for the computer, the first request indicating that the computer is to enter a firmware remote setup mode;
   send the first request to the computer;
   receive a broadcast message from the computer, the broadcast message indicating that the computer is ready for remote configuration;
   receive data about a current configuration of the firmware;
   generate, based at least in part on the current configuration, a second request, the second request to indicate respective parameter values corresponding to each of the one or more firmware parameters; and
   in response to the broadcast message, send the second request to the computer within a predetermined standby period.

10. The non-transitory computer-readable storage medium of claim 9, wherein the first request comprises instructions to the computer to set a remote setup flag and reboot.

11. The non-transitory computer-readable storage medium of claim 9, wherein sending the second request comprises sending the second request via a specific media access control (MAC) address.

12. A computer-implemented method comprising:
   generating a first request for a computer, the first request indicating that the computer is to enter a firmware remote setup mode;
   sending the first request to the computer to cause the computer to at least temporarily suspend one or more aspects of a normal reboot process during a reboot;
   receiving data about the current configuration of the firmware;
   generating a second request that indicates respective parameter values corresponding to each of one or more firmware parameters; and
   sending the second request to the computer while the one or more aspects of the normal reboot process are suspended.

13. The computer-implemented method of claim 12, further comprising:

identifying the computer for which the one or more firmware parameters of the firmware are to be updated.

14. The computer-implemented method of claim 12, wherein the first request comprises instructions to the computer to set a remote setup flag and to initiate the reboot.

15. The computer-implemented method of claim 12, further comprising:
    receiving a broadcast message from the computer, the broadcast message indicating that the computer is ready for remote configuration.

16. The computer-implemented method of claim 15, wherein sending the second request comprises sending the second request within a predetermined timeout period while the boot process is suspended in response to receiving the broadcast message.

17. The computer-implemented method of claim 12, wherein sending the second request comprises sending the second request via a specific media access control (MAC) address.

18. The computer-implemented method of claim 12, wherein the first request is formatted in one of hypertext transfer protocol (HTTP) or hypertext transfer protocol secure (HTTPS).

19. The computer-implemented method of claim 12, further comprising:
    receiving data about a current configuration of the firmware on the computer, wherein the second request is generated based at least in part on the current configuration of the firmware on the computer.

20. The computer-implemented method of claim 12, wherein the one or more aspects of the normal reboot process include at least some aspects of a Power-On Self-Test operation.

* * * * *